United States Patent
Davis et al.

(10) Patent No.: US 7,792,873 B2
(45) Date of Patent: Sep. 7, 2010

(54) DATA STRUCTURE SUPPORTING RANDOM DELETE AND TIMER FUNCTION

(75) Inventors: Gordon T. Davis, Chapel Hill, NC (US); Marco Heddes, Shelton, CT (US); Dongming Hwang, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 12/015,198

(22) Filed: Jan. 16, 2008

(65) Prior Publication Data

US 2008/0133467 A1  Jun. 5, 2008

Related U.S. Application Data

(63) Continuation of application No. 10/654,139, filed on Sep. 3, 2003, now Pat. No. 7,412,454.

(51) Int. Cl.
G06F 17/30 (2006.01)
G06F 7/00 (2006.01)

(52) U.S. Cl. ...................................... 707/802
(58) Field of Classification Search .................. 707/101, 707/3
See application file for complete search history.

(56) References Cited

U.S. PATENT DOCUMENTS

| | | | |
|---|---|---|---|
| 5,032,987 A | 7/1991 | Broder et al. | |
| 5,359,724 A | 10/1994 | Earle | |
| 5,379,422 A | 1/1995 | Antoshenkov | |
| 5,491,815 A * | 2/1996 | Basso et al. | 713/502 |
| 5,787,430 A | 7/1998 | Doeringer et al. | |
| 5,819,291 A | 10/1998 | Haimowitz et al. | |
| 5,838,957 A * | 11/1998 | Rajaraman et al. | 713/502 |
| 5,909,440 A | 6/1999 | Ferguson et al. | |
| 5,946,679 A | 8/1999 | Ahuja et al. | |
| 6,735,173 B1 * | 5/2004 | Lenoski et al. | 370/235 |
| 6,845,361 B1 * | 1/2005 | Dowling | 705/5 |
| 7,116,635 B2 * | 10/2006 | Nakano et al. | 370/230 |
| 7,194,563 B2 * | 3/2007 | Plourde, Jr. | 710/52 |
| 2004/0186820 A1 * | 9/2004 | Izume et al. | 707/1 |
| 2006/0239144 A1 * | 10/2006 | Gotoh et al. | 369/47.27 |

FOREIGN PATENT DOCUMENTS

| | | |
|---|---|---|
| JP | 8032613 A | 2/1996 |
| WO | WO 9827662 | 6/1998 |

* cited by examiner

*Primary Examiner*—Kuen S Lu
(74) *Attorney, Agent, or Firm*—James A. Lucas; Driggs, Hogg, Daugherty & Del Zoppo Co., LPA (57) ABSTRACT

A procedure is used to provide data structures that handle large numbers of active data entries and a high rate of additions and deletions of active entries. The procedure utilizes one or more of the following modifications. Timers are removed from individual session table entries and are linked via pointers. Bilateral links are established between the session table and the timer structure. Aging/timer checks are applied to the timer control block (TCB). A chain of TCBs, optionally including an excess of blocks, may be used along with packing of multiple TCBs into a single memory location. This excess of blocks permits a terminated session to continue to occupy a TCB until the timer process progresses to that block location in the chain of blocks.

17 Claims, 5 Drawing Sheets

Tree Structure with Efficient Updates and Aging

Figure 1: Basic Tree with Single Linked Rope Structure

Figure 2: Basic Tree with Double Linked Rope Structure

Figure 3: Tree Structure with Efficient Updates and Aging

Figure 4: Tree Structure with Timer Control Blocks

FIGURE 5: TABLE ENTRY FORMAT

FIG: 6

DATA STRUCTURE SUPPORTING RANDOM DELETE AND TIMER FUNCTION

CROSS-REFERENCE TO RELATED APPLICATIONS

This application is a continuation of U.S. patent application Ser. No. 10/654,139, filed Sep. 3, 2003.

This application is related to and commonly assigned U.S. patent application Ser. No. 09/543,531, filed Apr. 6, 2000, now U.S. Pat. No. 6,675,163, issued Jan. 6, 2004, and entitled "Full Match (FM) Search Algorithm Implementation for a Network Processor" and jointly submitted U.S. patent application Ser. No. 10/654,502, filed Sep. 3, 2003, and entitled "Data Search Structure Supporting Session Timer and Variable Aging Function Including Self Adjustable 2MSL", the contents of which are incorporated hereinto.

BACKGROUND OF THE INVENTION

1. Field of the Invention

This invention relates to the specific area of computer technology associated with the data structures useful in networking tasks. More specifically, it relates to dynamic data structures having the capability of adding large numbers of active file entries to data tables or deleting such file entries from these tables.

2. Discussion of Related Art

To assist in the understanding of the present invention and related art, the following abbreviations and acronyms are defined as follows:

Active Session—data entry being sought in a data structure containing data associated with a session that is currently sending and receiving packets.

Chained pointers—pointers within data objects that create a linked list of such objects.

Data structure—grouping of related table entries

DT—direct table

FIN—finish

FM—full match

FQ—free queue

Hashing—reducing the network portion of an address to a manageable index

MAC—media access control

Patricia tree—A table structure associated with binary searching techniques wherein all address strings and accompanying information are stored in a binary tree PSCB—pattern search control block TCB—timer control block Many commonly used networking tasks are organized by structuring various data bases (i.e. routing tables, active session state, etc.). Hash tables are often used with various mechanisms for resolving the case of multiple entries hashing to the same location (i.e. Patricia tree via chained pointers or "pattern search control blocks" (PSCBs) to the desired entry). Organization and maintenance of these data structures vary significantly according to the associated applications. In a first class, many of these data structures are static (at least when viewed over a short period of time), and are updated by a network administrator only in response to occasional network configuration changes, if at all. In a second class, routing tables may be updated based on communications with other routers in the network. There is a third class of data structures. These data structures may be characterized as dynamic, responding to normal data traffic by adding entries useful in processing subsequent traffic sharing some specific characteristics. Examples of such data structures include layer 2 MAC address tables used in bridging functions, and various session-based data structures. Since a session entry is kept only as long as a session is active, session-based structures are likely the most dynamic and, therefore, create the biggest challenge.

One specific challenge with dynamic tables is that these data structures will eventually get full. Even if there are basic procedures (i.e. detection of the end of a session) to remove obsolete entries, an occasional missing packet can cause these data bases to grow without bound, eventually overflowing available memory. A standard technique for controlling the total number of entries is to apply various aging or timer functions to active entries. These mechanisms test each active entry periodically to determine how long it has been since it was last used.

Figure 1:
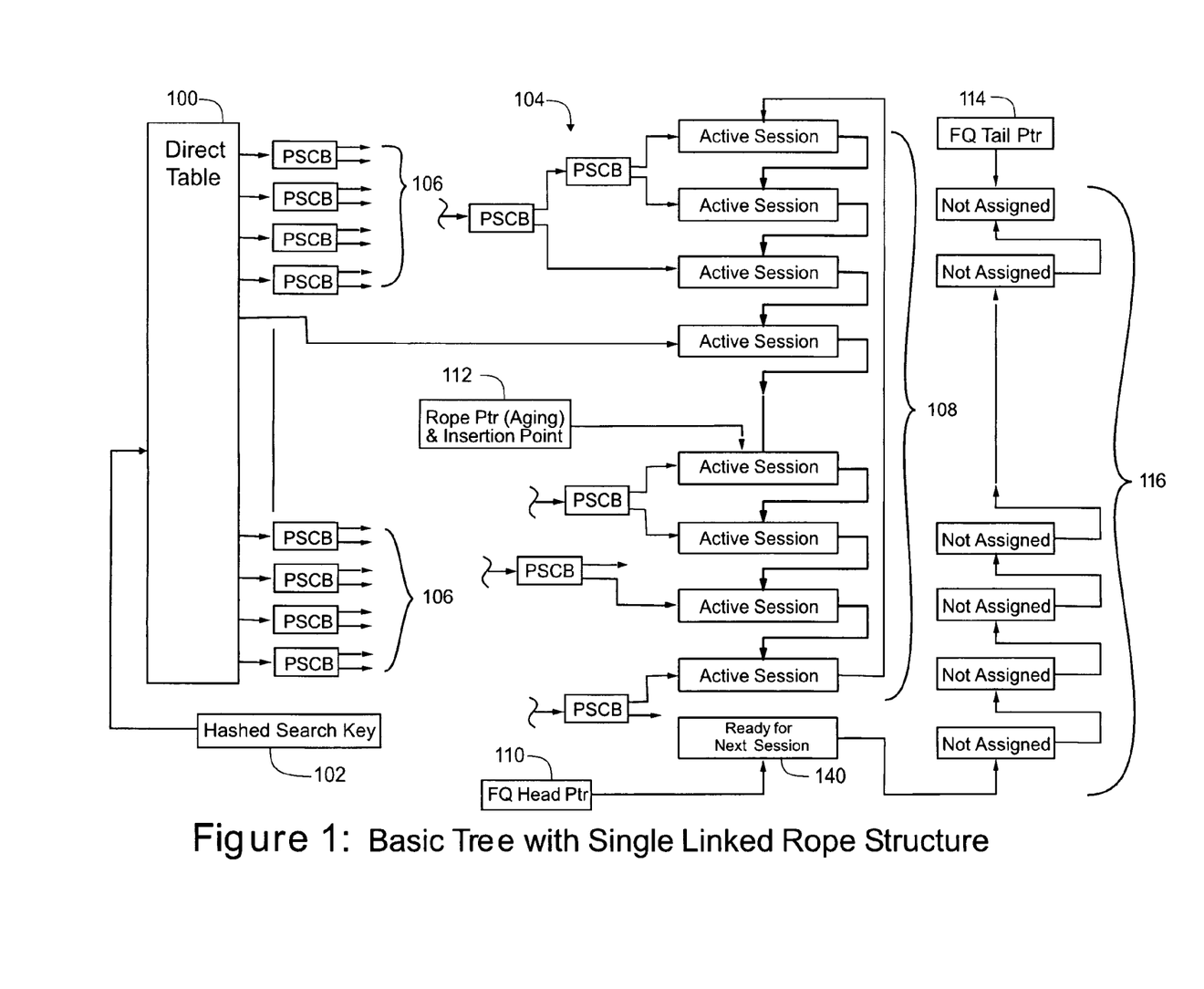
FIG. 1 shows a data structure of the related art used for aging or timer functions.

FIG. 1 illustrates a basic data structure capable of providing an aging or timer function. This data structure is based on a full match (FM) hash table algorithm described separately in said related patent application U.S. Ser. No. 09/543,531. This structure consists of a direct table (DT) 100 to which a hashed search key 102 is applied, with a tree structure 104 of pointers to resolve collisions in each DT entry. For a given search key, a chain of pointers called pattern search control blocks or PSCBs 106 in the tree structure will lead from the DT to the desired data, shown in the Figure as "active sessions" 108. Note that all active sessions are linked together in a loop, enabling a timer or aging function to step through all active sessions sequentially, looking for entries that have outlived their usefulness. This aging function not only points to the next active session 140 to test, but also controls the insertion point for new sessions and the deletion point for obsolete sessions. As required, a new session is established by moving an entry from the head 110 of the free queue 116 to the rope pointer insertion/deletion point 112 in the main tree structure 104. Likewise, an obsolete session is moved from the insertion/deletion point in the main structure 104 to the tail 114 of the free queue 116.

The data structure of FIG. 1 has usefulness in applications requiring random session deletes based on packet traffic being processed. For example, if a finish (FIN) message is detected for a specific session, the corresponding session may be marked for deletion, but the memory resource for that session is not be returned to the free queue until the aging pointer is advanced to this entry. This protocol results in numerous obsolete entries in the data structure that are waiting for the aging process to catch up, and thus limits the memory resources available for active entries. As a result, significant limitations are created in applications requiring both very large and very dynamic data structures.

Figure 2:
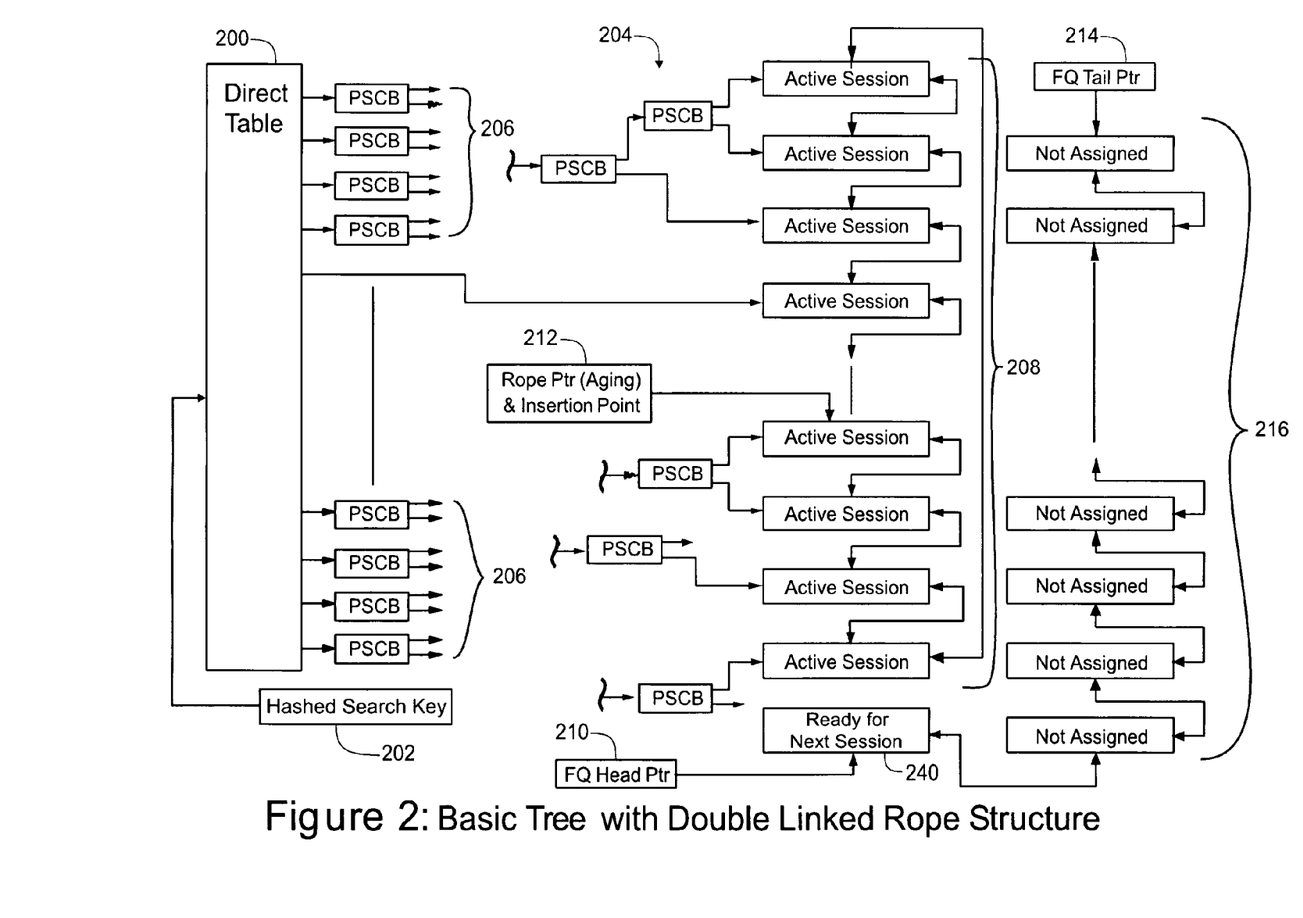
FIG. 2 shows another related search structure using a double linked list in timing or aging loop.

FIG. 2 illustrates a related art alternative to the structure described in FIG. 1, and uses a double linked list in the timing or aging loop. This data structure consists of a direct table (DT) 200 to which a hashed search key 202 is applied, with a tree structure 204 of pointers to resolve collisions in each DT entry. For a given search key, a chain of pointers, PSCBs 206 in the tree structure, lead from the DT to the active sessions 208. The double linked list enables a random delete to be processed immediately, since a given session entry contains pointers to both the session in front of it and the session behind it. As with FIG. 1, new sessions 240 are established by moving an entry from the head 210 of the free queue 216 to the rope pointer insertion/deletion point 212 in the main structure 204. In order to handle the possibility of missing an explicit request to delete a session, obsolete sessions may be aged out by moving them from the insertion/deletion point 212 in the main structure 204 to the tail 214 of the free queue 216. Thus, an obsolete session can immediately be removed from the timing/aging loop and returned to the free queue 216 for use by a subsequent new session.

This procedure solves the memory resource problem, but may create a performance problem for highly dynamic data structures due to the significant increase in memory accesses. In order to remove an entry from the double linked chain, three entries must be read, modified and written back. An additional entry must be read and written back to place the deleted entry on the free queue. A similar process is required for insertions of new sessions. For high rates of insertions and deletions, this can create a significant contention for access to memory resources. This contention not only increases latency for insertions and deletions, but affects normal packet processing as well, since normal packet processing contends for the same memory resources and encounters increased queuing delays due to the shared access.

One additional deficiency with the structures of both FIG. 1 and FIG. 2 relates to the accuracy of any implemented timer function. Typically, when a timer is started (or restarted), a timeout value is added to a time stamp in real-time and is written to the session entry. Then a timer support process examines each entry in the sequence determined by the loop of chained pointers, comparing the timer entry with the current time-stamp value. When a new packet is processed for a given session, its timer is restarted, resulting in a random distribution of time-out values in the loop. Then, in the worst case scenario, the timer support process may have to test every entry in the loop between the time the timer of a specific session actually expires and the time the session is actually tested. For a large data structure (e.g. 1 million entries), this could take hundreds of milliseconds. Conversely, the timer or aging process may have to read and test a given session entry for time-out multiple times before the timer actually expires, adding to the bandwidth utilization of the memory bus, and resulting in a corresponding increase in contention for access to that memory resource.

Figure 3:
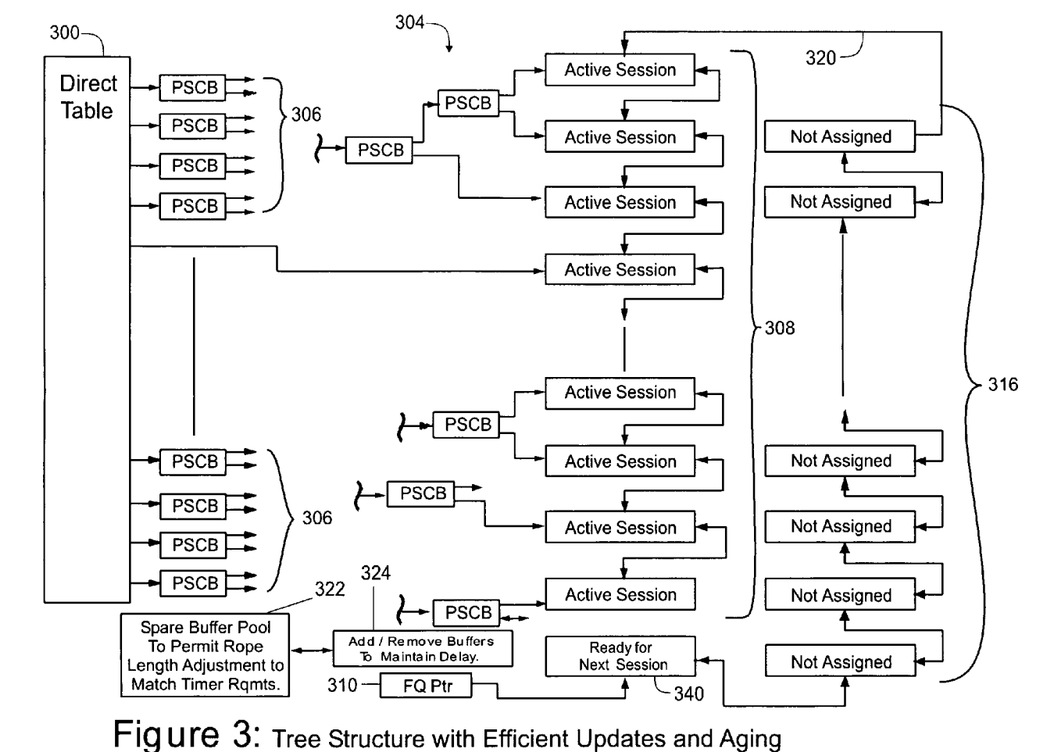
FIG. 3 shows yet another related art search structure with a variable aging function.

Some of these problems are overcome with the related art embodiment shown in FIG. 3. This figure illustrates an embodiment of the related invention described in Invention Disclosure RAL9-1999-0139. In mapping from a hashed search key (not shown) to a corresponding active session entry, this data structure uses the same direct table 300 and pattern search control block structure 304 illustrated in FIG. 1. The most significant difference is that the free queue 316 is merged with active sessions 308 into a larger timing loop 320. This simplifies insertions and deletions significantly, since there is no longer a requirement to rechain the session entry. A deletion simply detaches the PSCB and allows the obsolete entry to flow into the free queue section 316 of the loop. An insertion simply requires an advancement of the free queue head pointer 310 and modification of the tree structure to connect a PSCB 306 to the new session entry 340. Also different is the use of a spare buffer pool 322 to add and remove buffers from the loop at 324 to maintain delays.

SUMMARY OF THE INVENTION

In consideration of the limitations of existing dynamic data structures, it is an object of the present invention to provide enhanced data structures that efficiently handle large numbers of active entries with a high rate of session addition and deletion.

Another object of the present invention is to maximize the memory resources available for active sessions, and to minimize the performance impact of table updates both from code actions and from memory bandwidth utilization. One aspect of this feature is to remove the timer loop pointers and timeout values from the main entries in the data structure in order to reduce the overhead of processing the timers. This is accomplished by separating timer parameters from the main session data structure by using timer control blocks (TCBs) with link pointers to and from the associated session entries in the main data structure.

It is an additional object of the subject invention to support more precise time-out capabilities, simultaneously with random deletions of terminated sessions. One aspect is to include the free queue of timer control blocks in the same timer loop used for timer control blocks assigned to active sessions, thus minimizing the overhead for insertions. Yet another aspect is to partition the timing loop into multiple shorter loops, each with its own timer support task, in order to better support different time-out values or different expected packet response times for different packet types.

The invention relates to a system and the corresponding method for managing dynamic data structures. The method includes the following steps: (a) separating timer parameters (e.g. loop point values and timeout values) from the main entries in the data structure; and (b) establishing an association between said timer control blocks and corresponding session entries in the search structure. The invention also includes the further step of including a free queue of timer control blocks in the same timer loop used for TCBs assigned to active sessions. The timer loop can be partitioned into multiple shorter loops, each of the shorter loops being provided with its own timer support task. An association is established between each session entry and its timer control block using bidirectional pointers. A single pointer is used by each session entry to identify its TCB which, in turn, uses its pointer to identify the session entry.

The invention further includes a procedure for inserting a new session that includes the steps of building a conventional data entry in a search structure, such as a Patricia tree. It also includes a procedure for deleting an old session that includes clearing the TCB and removing the session entry from the tree structure. The TCB is later added to the tail of the TCB free queue by a background timer/queue management function. The background timer/queue management function steps through the chain of TCBs, passing TCBs to the free queue section of the TCB chain. The timer value in each TCB is compared to the current time and declares an expired timer if the current time exceeds the timer value. In the case of an expired timer, the associated session is deleted by using the pointer from the TCB to the session entry to delete the session entry from the main data structure. The examining of TCBs by the timer/queue management function is paced to examine an active TCB at the point that the TCB expires. A timer restart action causes the TCB to be recirculated and causes the session entry to be updated to point to a new TCB. Deletion of a session will cause the session entry to be returned to a free queue and will cause the TCB pointer to be revised to created idle entries in the free queue. The invention is useful with data structures generally, but in particular it is useful with tree search structures comprising a direct table and multiple pattern search control blocks.

The invention also relates to a computer implemented medium containing the instructions needed to cause the system to permit the method to be carried out. A timeout will cause the pointer from the TCB to the session entry to delete the session entry from the main data structure.

BRIEF DESCRIPTION OF THE DRAWINGS

FIG. 6 shows a computer readable medium comprising a floppy disc.

DETAILED DESCRIPTION OF THE INVENTION

As mentioned previously, FIG. 1 shows the use of random session deletes.

FIG. 2 shows the use of a double linked list in a timing or aging loop. The drawbacks of these two approaches were also previously explained. With a data structure as in FIG. 3, both random deletes and timer restart actions leave obsolete session entries within the active region of the timer loop, potentially creating unused holes in the memory resource.

Figure 4:
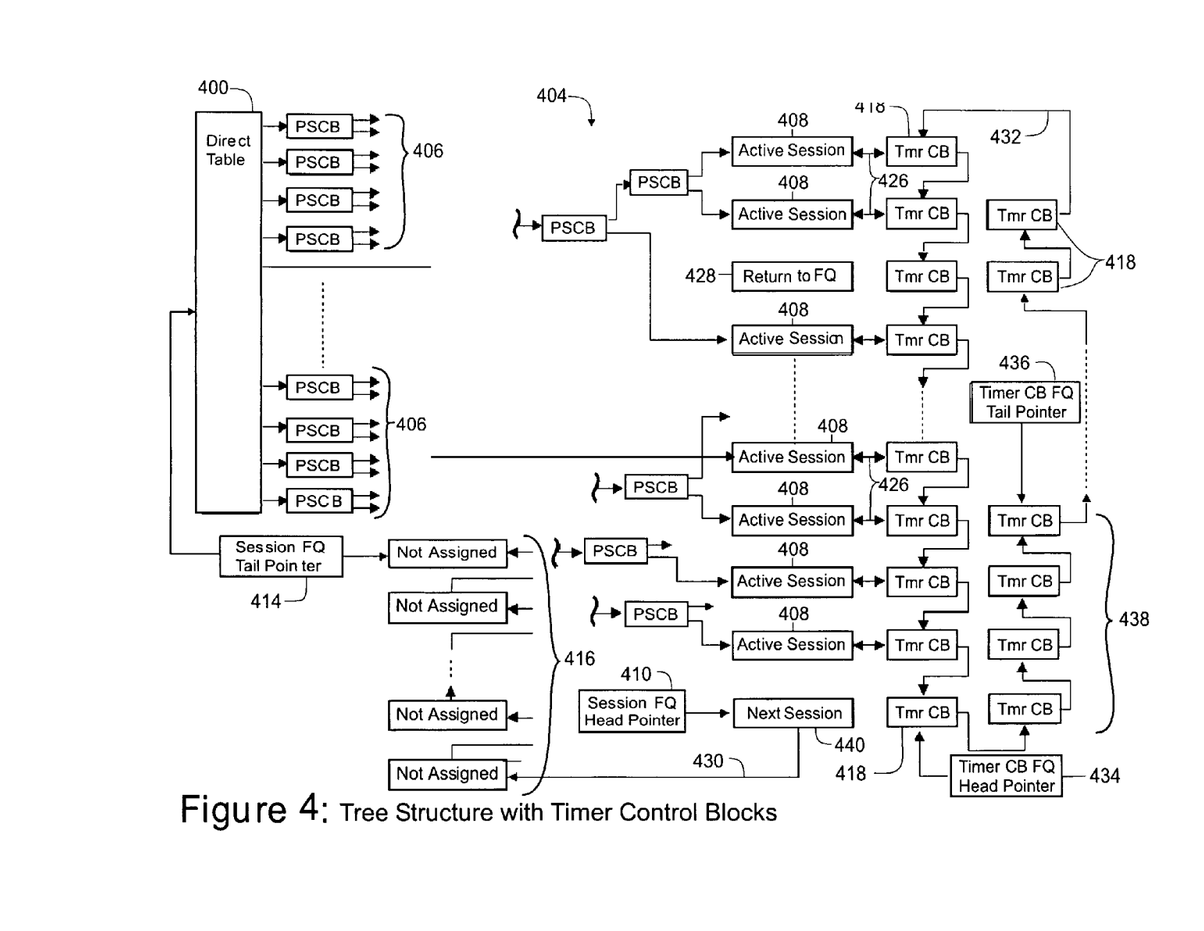
FIG. 4 shows the data structure of the present invention with timer control blocks.

According to the present invention, FIG. 4 enhances the basic mechanisms of FIGS. 1-3 for applications requiring more dynamic timer functions. In mapping from a hashed search key (not shown) to a corresponding active session entry, this data structure can utilize the same direct table 400 and pattern search control blocks 404 as before. For each search key, the chain of pointers 406 connects the entries in the DT 400 to the active sessions 408, as illustrated in FIGS. 1-3. An insertion of the next session 440 requires an advancement of the FQ head pointer 410 and modification of the tree structure to connect a PSCB 406 to the new session entry. A deletion simply disconnects the session from the PSCB and allows the obsolete entry 428 to flow to the tail pointer 414 of the free queue section 416 of the loop.

According to the present invention, FIG. 4 enhances the basic mechanisms of FIGS. 1-3 for applications requiring more dynamic timer functions. This structure is improved by partitioning the session entry into two loops, one loop (430) for the basic session data and the other (432) for timer control blocks (TCBs) 418. The timer loop and timeout values are totally independent of the session entry 408, but an association is maintained between a session entry and its TCB via bidirectional pointers 426 (i.e. the session entry uses a single pointer to identify its TCB, and the TCB maintains a pointer to the session entry). During a timer restart action, only the TCB is recirculated, while the session entry is only updated to point to the new TCB. Thus, while holes in the timer loop of TCBs may develop, this effect is totally avoided in the session entries, enabling 100% utilization of session entry resources for active sessions. It should be noted that the size of a session data entry is significantly larger than the size of a TCB (64 bytes vs. 8 bytes). Thus, holes of unused memory resource are significantly less costly in the TCB structure than in the main session data structure. Explicitly deleted sessions (either due to receipt of FIN packet or detection of timeout) will cause a session entry to be returned to the free queue 416 where the TCB head pointer 434 is reused to create a chain of idle entries in the free queue. On the other hand, if a timeout occurs, the process may use the pointer 426 from the TCB to the session entry in order to delete the session entry from the main data structure.

Note that in FIG. 4 dotted lines are used for the TCB timing loop, suggesting an implicit loop without requiring an individual timing loop pointer in each TCB. This is possible if the loop structure is simply ascending (or descending) physical memory locations until a predefined limit is reached. This limit may be adjustable over time if adjustments are required in the number of TCBs available in the free queue. Mechanisms similar to those described with reference to FIG. 3 may be utilized to control the size of the timing loop.

The implicit timer loop 432 is a feature that can be used to reduce the required size of each TCB at the expense of some flexibility in TCB structure.

The system illustrated in FIG. 4 can easily be extended to support two or more separate timer loops, each of which is consistent with the description above. This is desirable when two or more distinct timeout values are typically used. For example, it may be desirable to have one timeout value for client response time, and another value for server response time. Alternately, one may implement a separate timing loop for each phase of a TCP session. In either case, receipt of a new packet might require that the TCB relating to the new packet be removed from its current timing loop and placed on a subsequent timing loop. This can be accomplished by simply copying the TCB contents to a leaf of a new TCB in the new timing loop, and marking the old one for deletion. Note that this is no more work (code path) or memory bandwidth than recirculating the TCB within the same timing loop.

Advantageously, the TCB only requires a timer value and a pointer to its associated session entry (fitting easily in an 8 byte structure). Thus, while a typical session may require data structures of up to 64 bytes (consuming all four DRAM banks on a memory with a 32 bit data bus), a TCB only consumes a single bank in a DRAM with a 16 bit data bus. This results in a much higher tolerance for holes of unused TCBs, since, even a DRAM of half the size, can hold four times the maximum possible number of session entries in the larger DRAM. A significant performance advantage is achieved as well, since all timer processing is focused on a separate memory array, thus avoiding contention between the timer process and normal packet processing for memory bus bandwidth. Additional performance advantage is achieved because the timer process can fetch four separate TCBs in a single memory cycle (one from each bank), making the process much more efficient. In consideration of this memory access efficiency, as well as the higher tolerance to holes of unused entries in the data TCB structure, a separate timer process is illustrated in FIG. 4, in contrast to the suggestion with FIG. 3 that the timer process might be merged with normal packet processing. The timer process steps through TCBs one at a time, and passes each TCB to the tail 436 of the TCB free queue. As it processes a TCB, the timer value in the TCB is compared with the current time. If the TCB timer value has been cleared, the TCB is passed without further processing. If the TCB timer value is greater than the current time, the process calculates the time left before the timer expires, and sets up to reexamine the TCB when it expires. This may be done by setting up an asynchronous interrupt, by periodic polling, or numerous other mechanisms. Thus, the examination of TCBs is synchronized to the timeout settings, resulting in precise detection of expiring timers. Note that since the TCB chain is static, and TCBs are initialized in order with equivalent timeout values, the TCB being examined by the timer task will never block another TCB that expires sooner. In order to maintain this characteristic, each unique timeout value requires a different chain of TCBs. Actually, either approach can be considered. an optional feature of either data structure. Likewise, other features, such as caching of session data or partitioning of the timer loop into multiple loops with different timer values, can be considered as optional features of either data structure and are encompassed within the scope of the present invention.

Figure 5:
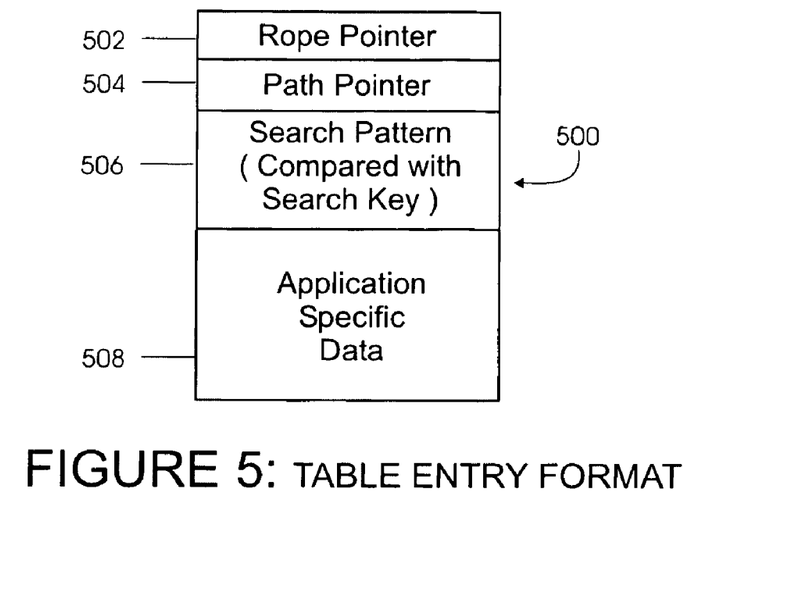
FIG. 5 shows a table entry format.

FIG. 5 illustrates a typical format 500 for each session entry. Note that, in addition to the rope pointer 502 used to build the timing loop, a path pointer 504 is provided to point to the immediately connected TCB to facilitate recirculation of TCBs during timer restart actions. Note that it is possible for the rope pointer 502 and the path pointer 504 to utilize the same physical location within the entry, since the rope pointer 502 is only used when the entry is in the free queue, and the path pointer 504 is only used for an active session. As with other standard tree entry formats, the search pattern box field 506 keeps a copy of the search key to validate a match during search actions. The application specific data block 508 shows the remaining fields of each entry that are unique to a particular session. These may contain routing information, address translation and other frame alteration information, session state, timer values, etc.

Detailed procedures for maintaining the data structure of FIG. 4 include a procedure for inserting a new session, a procedure for deleting an old session, and a procedure for handling an expired timer. Details of each of these procedures are described in the following paragraphs.

The following steps are required to insert a new session into the data structure:

Get semaphore on TCB free queue head pointer 436. The semaphore is required to support a system with multiple processors accessing a shared data structure. The requesting processor must lock the head pointer before using it to de-queue a fresh TCB. A hardware supported atomic read-modify-write function could eliminate the requirement of using semaphores. Likewise, a single processor system would not require semaphores if the critical procedures could be protected from context switches.

Read TCB FQ head pointer—The TCB FQ head pointer 434 is a shared resource that points to the next available TCB in the free queue 438 of unused TCBs. Once the semaphore has been acquired to lock the head pointer, the head pointer must be read in order to know the address of the TCB to be used for the new session.

Read TCB at head of FQ (get TCB FQ chain pointer to update FQ head pointer 434)—The TCB may now be initialized according to requirements of the new session. In the case where the free queue is explicitly chained, the new TCB entry will also contain a chain pointer to the next TCB in the free queue.

Write updated TCB FQ head pointer 434—The head pointer must be updated to point to the new head of the free queue. The address may be derived from a chain pointer field in the TCB just removed from the free queue in the case of an explicitly chained free queue, or the previous value of the FQ head pointer may simply be incremented in the case of an implicitly chained free queue.

Get semaphore on leaf (session) free queue head pointer 410—The semaphore is required to support a system with multiple processors accessing a shared data structure. The requesting processor must lock the head pointer before using it to de-queue a fresh table entry structure (i.e. leaf). A hardware supported atomic read-modify-write function could eliminate the requirement of using semaphores.

Release semaphore on TCB free queue head pointer 434—The semaphore lock on the TCB FQ head pointer must be released to allow other processors in the system to access it. This could be done immediately after updating the TCB FQ head pointer, but is typically delayed to allow the new semaphore request (leaf FQ head pointer) to be issued sooner to minimize the impact of the semaphore service latency.

Read leaf FQ head pointer 410—The Leaf FQ head pointer is a shared resource that points to the next available table entry structure in the free queue 416 of unused leaves. Once the semaphore has been acquired on the head pointer, the head pointer must be read in order to know the address of the leaf to be used for the new session.

Read leaf at head of FQ (get leaf FQ chain pointer to update FQ head pointer)—The leaf may now be initialized according to requirements of the new session. The new leaf entry will also contain a chain pointer to the next leaf in the free queue which is used to update the free queue head pointer.

Write updated leaf FQ head pointer 410—The head pointer must be updated to point to the new head of the free queue. The address is derived from a chain pointer field in the leaf just removed from the free queue.

Get semaphore on PSCB free queue head pointer (not shown). (Prefetch based on anticipated latency)—The semaphore is required to support a system with multiple processors accessing a shared data structure. The requesting processor must lock the head pointer before using it to de-queue a fresh PSCB. A hardware supported atomic read-modify-write function could eliminate the requirement of using semaphores.

Release semaphore on leaf free queue head pointer 410—The semaphore lock on the leaf FQ head pointer must be released to allow other processors in the system to access it. This could be done immediately after updating the leaf FQ head pointer, but is typically delayed to allow the new semaphore request (PSCB FQ head pointer) to be issued sooner to minimize the impact of the semaphore service latency.

Write TC8 TCB (pointer to leaf and new session timer value)—Now that the address of the session data has been determined, the previously allocated TCB can be initialized with the pointer to that address, along with the desired timer value. Specific timer values are application specific.

Write leaf (new session data)—The allocated table entry structure is initialized with session specific data, including a pointer to the TCB allocated to support the session.

Wait for semaphore on PSCB free queue head pointer.

Read PSCB FQ head pointer—The PSCB FQ head pointer is a shared resource that points to the next available PSCB in the free queue of unused PSCBs. Once the semaphore has been acquired on the head pointer, the head pointer must be read in order to know the address of the PSCB to be used for the new session.

Read PSCB at head of FQ (get PSCB FQ chain pointer to update FQ head pointer)—The PSCB may now be initialized according to requirements of the tree structure to connect the new session. The new PSCB will also contain a chain pointer to the next PSCB in the free queue which is used to update the free queue head pointer.

Get semaphore on DT entry (Prefetch based on anticipated latency)—Locking one entry in the DT 400 allows updates to the tree structure attached to that DT entry without conflict from parallel updates from other processors. The first 'n' bits of the search key associated with the new session are used to identify one entry from a total of $2^n$ available entries.

Write updated PSCB FQ head pointer—The head pointer must be updated to point to the new head of the free queue. The address is derived from a chain pointer field in the PSCB just removed from the free queue.

Release semaphore on PSCB free queue head pointer—The semaphore lock on the PSCB FQ head pointer must be released to allow other processors in the system to access it. This could be done immediately after updating the leaf FQ head pointer, but is typically delayed to allow the new semaphore request (DT entry) to be issued sooner to minimize the impact of the semaphore service latency.

Wait for semaphore on DT entry.

Read DT/PSCB chain to point of insertion (1 DT rd; 2 PSCB rd)—Once the semaphore is acquired on the appropriate DT entry, the search key associated with the new session is used to walk the chain of PSCB pointers to the end of the chain. The new PSCB and table entry will be added at that point.

Write 1-3 PSCB pointers (or DT and up to two PSCB pointers)—The PSCB found at the insertion point must be updated to point to the new PSCB. The new PSCB contains two pointers, one of which points to the existing table entry that the insertion point PSCB used to point to, and the other points to the new table entry. Only one write is required to initialize the DT entry to point to the new table entry if the DT entry is currently not being used. In this case, no new PSCB is required, and the steps above that relate to de-queuing a PSCB from the free queue may be skipped.

Release semaphore—The semaphore lock on the DT entry must be released to allow other processors in the system to access it.

The following steps are required to delete a terminated session from the data structure. This procedure may be initiated either by an explicit session state change, or received packet, or by the expiration of a timer:

Assume address of leaf to be deleted is known—Typically, the session entry to be deleted has just been accessed in the process of forwarding the packet that indicates the termination of the session. The session data includes the search key that can be used to locate other tree elements associated with the entry (e.g. DT, PSCBs).

Get semaphore on DT entry—Locking one entry in the DT allows updates to the tree structure attached to that DT entry without conflict from parallel updates from other processors. The first n bits of the search key associated with the terminating session are used to identify one entry from a total of $2^n$ available entries.

Read DT/PSCB chain to point of deletion (1 DT rd; 2 PSCB rd)—Once the semaphore is acquired on the appropriate DT entry, the search key associated with the terminating session is used to walk the chain of PSCB pointers to the end of the chain. The table entry will be removed at that point, typically resulting in one excess PSCB that must also be removed. In the case that the entry for the terminating session is connected directly to a DT entry, there would not be an excess PSCB to remove, and the steps below relating to returning the PSCB to the free queue may be skipped.

Get semaphore on leaf free queue tail pointer 414 (Prefetch based on anticipated latency)—The semaphore is required to support a system with multiple processors accessing a shared data structure. The requesting processor must lock the tail pointer before using it to enqueue the table entry structure (i.e. leaf) just removed from the table. A hardware supported, atomic read-modify-write function could eliminate the requirement of using semaphores.

Write 0, 1 or 2 PSCB pointers (or DT and up to one PSCB pointers)—The PSCB found at the deletion point must be removed. That PSCB contains 2 pointers, one of which points to the terminating table entry and the other points to some other table entry or a subsequent PSCB. In order to remove the PSCB at the deletion point, the previous PSCB or DT entry must be updated to point to that other table entry or PSCB. If the entry to be deleted is connected directly to a DT entry, that DT entry is written with a null pointer, but no PSCB manipulation is required and the following steps to return the PSCB to the free queue may be skipped.

Release semaphore on DT entry—The semaphore lock on the DT entry must be released to allow other processors in the system to access it.

Write zero to TCB 418 (Timer process will add TCB to FQ later)—Clearing the TCB will be an indication to the background timer process that the TCB is no longer in use and can be passed to the free queue section of the TCB loop.

Wait for semaphore on leaf free queue tail pointer.

Read leaf FQ tail pointer 414—The leaf FQ tail pointer is a shared resource that points to the most recently terminated table entry structure in the free queue of unused leaves. Once the semaphore has been acquired on the tail pointer, the tail pointer must be read in order to know the leaf address to be used to maintain the free queue chain of pointers.

Read leaf at bottom of FQ—The leaf must be read in order to overlay the updated pointer.

Write leaf with updated FQ chain pointer (point to deleted leaf)—The chain pointer in the leaf must be updated to point to the leaf currently being deleted in order to maintain the pointer chain structure of the leaf free queue.

Get semaphore on PSCB free queue tail pointer (Prefetch based on anticipated latency)—The semaphore is required to support a system with multiple processors accessing a shared data structure. The requesting processor must lock the tail pointer before using it to enqueue an obsolete PSCB freed by the delete process. A hardware supported atomic read-modify-write function could eliminate the requirement of using semaphores.

Write updated leaf FQ tail pointer (points to deleted leaf)—The tail pointer must be updated to point to the new tail of the free queue. The address is derived from the address of the leaf just added to the free queue.

Release semaphore on leaf FQ tail pointer—The semaphore lock on the leaf FQ tail pointer must be released to allow other processors in the system to access it. This is done immediately after updating the leaf FQ head pointer, but could also be delayed to allow a new semaphore request to be issued sooner to minimize the impact of the semaphore service latency.

Wait for semaphore on PSCB free queue tail pointer

Read PSCB FQ tail pointer—The PSCB FQ tail pointer is a shared resource that points to the most recently discarded PSCB in the free queue of unused PSCBs. Once the semaphore has been acquired on the tail pointer, the tail pointer must be read in order to know the PSCB address to be used to maintain the free queue chain of pointers.

Read PSCB at bottom of FQ—The PSCB must be read in order to overlay the updated pointer.

Write PSCB with updated FQ chain pointer (point to deleted PSCB)—The chain pointer in the PSCB at the bottom of the free queue must be updated to point to the PSCB currently being deleted in order to maintain the pointer chain structure of the PSCB free queue.

Write updated PSCB FQ tail pointer (points to deleted PSCB)—The tail pointer must be updated to point to the new tail of the free queue. The address is derived from the address of the PSCB just added to the free queue.

Release semaphore on PSCB FQ tail pointer—The semaphore lock on the PSCB FQ tail pointer must be released to allow other processors in the system to access it.

The following steps are required to restart a timer restart in response to a session state change or received packet:

Get semaphore on TCB free queue head pointer 434—The semaphore is required to support a system with multiple processors accessing a shared data structure. The requesting processor must lock the head pointer before using it to de-queue a fresh TCB. A hardware supported atomic read-modify-write function could eliminate the requirement of using semaphores.

Read TCB FQ head pointer—The TCB FQ head pointer is a shared resource that points to the next available TCB in the free queue of unused TCBs. Once the semaphore has been acquired to lock the head pointer, the head pointer must be read in order to know the address of the TCB to be used for the new timer period.

Read TCB at head of FQ (get TCB FQ chain pointer to update FQ head pointer—not necessary with implicit timer loop.)—The TCB may now be initialized according to requirements of the session. In the case where the free queue is explicitly chained, the new TCB entry will also contain a chain pointer to the next TCB in the free queue.

Write updated TCB FQ head pointer—The head pointer must be updated to point to the new head of the free queue. The address may be derived from a chain pointer field in the TCB just removed from the free queue in the case of an explicitly chained free queue, or the previous value of the FQ head pointer may simply be incremented in the case of an implicitly chained free queue.

Get semaphore on leaf (may be safe without semaphore, depends on application)—A semaphore is required on the leaf if multiple packets for the same session might be processed by different processors during the same time interval.

Release semaphore on TCB free queue head pointer—The semaphore lock on the TCB FQ head pointer must be released to allow other processors in the system to access it. This could be done immediately after updating the TCB FQ head pointer, but is typically delayed to allow the new semaphore request (Leaf FQ head pointer) to be issued sooner to minimize the impact of the semaphore service latency.

Read leaf—The leaf contents must be read in preparation for overlaying an updated pointer to the new TCB.

Write TCB (pointer to leaf and restarted session timer value)—The timer value is initialized in the new TCB according to application requirements and the leaf pointer address is copied from the old TCB.

Write zero to old TCB (Timer process will add TCB to FQ later)—Clearing the TCB will be an indication to the background timer process that the TCB is no longer in use and can be passed to the free queue section of the TCB loop.

Write leaf (update pointer to new TCB)—The session reference must be changed from the old TCB to the new TCB.

Release semaphore on leaf—The semaphore lock on the leaf must be released to allow other processors in the system to access it.

The memory capacity required for TCBs is evaluated to determine how many TCBs are no longer used but are not yet available for reuse. These so-called holes are created since sessions are not always terminated in the same order that they originate and, more significantly, because some sessions do not terminate normally, the background timer functions to free the TCB and terminate the session. Note that to minimize memory accesses, TCBs are maintained in a static loop, preventing obsolete TCBs from entering the free queue until all TCBs in front of them have entered the free queue. The mix of normally terminating sessions to sessions terminated via timeout was varied in several simulation runs. The results of these simulations show that:

1. The time required for the system to stabilize initially is (to a first order) independent of the mix of normal session terminations to timeout terminations.

2. As the timeout termination rate is increased, the number of holes created in the TCB structure decreases, resulting in a larger number of available TCBs in the free queue.

3. The required TCB size can be easily predicted using the packet response time and new session rate. For a number of configurations of practical interest, the number of TCBs required is less than four times the number of sessions supported.

FIG. 6 shows a computer-readable medium in the form of a floppy disc 600 for containing the software implementation of the program to carry out the various steps of the process according to the present invention. Other machine readable storage mediums, such as fixed hard drives, optical discs, magnetic tapes, semiconductor memories, such as read-only memories (ROMs), programmable (PROMs), are also contemplated as being used within the scope of the invention. The article containing this computer readable code is utilized by executing the code directly from the storage device, or by copying the code from one storage device to another storage device, or by transmitting the code on a network for remote execution.

Although the discussion has been directed to specific search structures, such as a tree structure using a direct table and pattern search control blocks, the invention is likewise useful with other search structures, such as hash tables, particularly large hash tables having serial resolution of collisions, and CAMs (content addressable memories), particularly tertiary CAMs. Likewise, any other search application with similar structures can take advantage of the unique features this invention. Typically, the searches may be carried out using devices and techniques such as state machines of the type that have been previously described in published literature.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the present invention as defined and limited by the appended claims.

What is claimed is:

1. In a computer processor system for transferring an active file entry to and from a dynamic data structure in connection with networking tasks, comprising:
   a) a data structure to handle the addition and the deletion of a large number of data entries;
   b) at least one data entry associated with said data structure;
   c) a timer control block for each data entry;
   d) a bidirectional link pointer between each data entry and its corresponding timer control block; and
   e) a tree structure consisting of a direct table (DT) and pattern search control blocks (PSCBs) to associate each data entry with a unique search key, said tree structure created by:

1) adding a new data entry to the data structure by:
   a) removing an empty data entry from the data entry free queue;
   b) removing an empty timer control block from the timer control block free queue; and
   c) initializing the data entry and timer control block with application specific parameters and pointers to associate the data entry and timer control block, and
2) modifying the DT and PSCBs within the data structure to enable a search process to locate the added data entry.

2. The system according to claim 1 further including a search function to search the data structure to identify one of the data entries matching a search criteria.

3. The system according to claim 2 further comprising a timer function, wherein the timer function checks a timer value in the timer control block for each data entry.

4. The system according to claim 3 wherein each data entry represents a network session.

5. The system according to claim 4 further including sufficient timer control blocks to permit a terminated session to occupy a block until the timer function progresses to the block.

6. The system according to claim 2 wherein the data structure comprises a direct table and pattern search control blocks arranged in a tree structure that includes a unique search key for each data entry.

7. The system according to claim 6 wherein a plurality of timer control blocks are arranged in a fixed circular chain including a first section containing a free queue of timer control blocks and a second section containing timer control blocks assigned to active data entries.

8. The system according to claim 7 wherein the circular chain of timer control blocks is partitioned into multiple shorter loops, each of which includes its own timer support task.

9. The system according to claim 8 wherein a partition supports only timer control blocks initialized with the same timeout duration, and the order of timer control blocks within a partition are maintained in order of expected timer expiration.

10. The system according to claim 7 further including a timer restart that causes the timer control block to be recirculated, and further causes the data entry to be updated to be associated with a new timer control block.

11. The system according to claim 7 wherein a timer function is capable of detecting timer control blocks marked as idle and advancing a timer control block free queue tail pointer to effectively recirculate timer control blocks associated with terminated data entries for subsequent use with new data entries.

12. The system according to claim 11 wherein the timer function is able to detect timer control blocks with a timer value indicating the associated timer has expired.

13. The system according to claim 12 wherein the timer function, upon detection of an expired timer, is capable of advancing the timer control block free queue tail pointer to effectively recirculate timer control blocks associated with data entries for subsequent use with new data entries.

14. The system according to claim 13 wherein the timer is programmed to process timer control blocks marked as idle immediately but to delay processing of active timer control blocks to insure that active timer control blocks are processed at approximately the time their associated timer expiration value is equal to the current time maintained by the timer function.

15. A computer readable storage medium containing a program for transferring an active file entry to and from a dynamic data structure, comprising instructions to:
   a) partition said active file into basic application data and a timer control block;
   b) maintain an association between an active entry and its corresponding timer control clock using a bidirectional pointer;
   c) include a free queue of timer control blocks in the same timer loop used for timer control blocks assigned to active sessions; and
   d) construct a tree structure consisting of a direct table (DT) and pattern search control blocks (PSCBs) to associate each data entry with a unique search key, wherein the construction of the tree structure includes the additional process of:
   1) adding a new data entry to the data structure by:
      a) removing an empty data entry from the data entry free queue;
      b) removing an empty timer control block from the timer control block free queue; and
      c) initializing the data entry and timer control block with application specific parameters and pointers to associate the data entry and timer control block, and
   2) modifying the DT and PSCBs within the data structure to enable a search process to locate the added data entry.

16. The computer readable storage medium according to claim 15 wherein the instructions direct an aging function to point to the next active session to test and control an insertion point for a new session and a deletion point for obsolete sessions.

17. The medium according to claim 16 wherein the instructions direct a timer restart action to re-circulate a timer control block and causes a new data entry to be updated to be associated with the recirculated timer control block.

* * * * *